United States Patent [19]
Woodward

[11] Patent Number: 5,944,462
[45] Date of Patent: Aug. 31, 1999

[54] HOLE CUTTING TOOL FOR CHAMFERING AND GROOVING

[75] Inventor: Bruce C. Woodward, Greensburg, Pa.

[73] Assignee: Kennametal Inc., Latrobe, Pa.

[21] Appl. No.: 09/065,395

[22] Filed: Apr. 23, 1998

[51] Int. Cl.[6] ............................................... B23G 5/20
[52] U.S. Cl. ........................... 409/74; 408/211; 408/222; 409/66; 470/199
[58] Field of Search .................... 409/66, 74, 65, 409/71, 78; 408/222, 219, 211, 20, 218, 713; 470/199; 407/31, 35

[56] References Cited

U.S. PATENT DOCUMENTS

| | | |
|---|---|---|
| 2,437,822 | 3/1948 | Jones . |
| 3,940,214 | 2/1976 | Waschek ................................... 408/26 |
| 4,505,626 | 3/1985 | Benhase ................... 408/224 |
| 4,761,844 | 8/1988 | Turchan ................. 409/74 X |
| 4,831,674 | 5/1989 | Bergstrom et al. .................... 409/74 X |
| 4,844,670 | 7/1989 | Heule ....................... 408/224 |
| 5,035,551 | 7/1991 | Neumann ................. 408/224 |
| 5,069,093 | 12/1991 | Carswell .................................. 82/1.11 |
| 5,137,397 | 8/1992 | Koketsu .................... 408/1 R |
| 5,173,013 | 12/1992 | Gorse et al. ............................. 408/22 |
| 5,186,584 | 2/1993 | Müller et al. ............................. 408/26 |
| 5,288,184 | 2/1994 | Heule ...................... 408/224 |
| 5,439,330 | 8/1995 | Bayer et al. ............................ 408/1 R |
| 5,678,962 | 10/1997 | Hyatt et al. .............................. 409/66 |

Primary Examiner—William Briggs
Attorney, Agent, or Firm—John J. Prizzi; John M. Vasuta

[57] ABSTRACT

A hole cutting tool for holemaking, chamfering, grooving, threading and/or O-ring grooving. The tool is a rotary tool for holemaking in a workpiece which includes one or more holemaking inserts about the outermost end of the tool, at least a pair of axially spaced apart chamfering inserts radially sunken into the intermediate portion of the tool, and one or more grooving inserts also radially sunken into the intermediate portion of the tool between the chamfering inserts, all of which provides for holemaking with chamfered entrance and exit edges and/or a slot, groove, or threads within the hole. An additional O-ring grooving insert may be provided to cut an annular groove around the hole on an end face of the workpiece.

22 Claims, 8 Drawing Sheets

HOLE CUTTING TOOL FOR CHAMFERING AND GROOVING

FIELD OF THE INVENTION

The present invention relates generally to a hole cutting tool for holemaking, chamfering, and grooving. More particularly, the present invention relates to a rotary tool for holemaking in a workpiece where the entrance edge and exit edge is chamfered and/or a slot, groove, or thread is cut either or both within the hole at some plane midway between the entrance and exit edges or on the entrance face adjacent the hole. Specifically, the invention is a rotary tool for holemaking which includes one or more holemaking inserts about the outermost end of the tool, at least a pair of axially spaced apart chamfering inserts radially sunken into the intermediate portion of the tool, and one or more grooving inserts either or both radially sunken into the intermediate portion of the tool between the chamfering inserts or positioned at a radially outermost point inward of the innermost chamfering insert, all of which provides for holemaking with chamfered entrance and exit edges and a slot, groove, or threads within the hole and/or a seal or similar groove just outside of the hole.

BACKGROUND OF THE INVENTION

Holemaking such as drilling has long been known in the metalcutting art. Holemaking using drills or mills with cutting inserts thereon has also long been known in the art. On example of such a drill with a carbide cutting insert is shown in U.S. Pat. No. 4,659,264 issued to Kennametal Inc. The drill has a shank with at least one cutting insert on one end of the shank.

Drills and milling cutters have developed from this early technology into more complex drill bodies and milling heads with multiple inserts thereon positioned at particular angles, locations and overlaps to provide more rapid drilling and milling and/or better finished surfaces. On such milling head is shown in U.S. Pat. No. 5,672,031 issued to Kennametal Inc. Numerous such drill bodies are shown on pages 75–134 in Kennametal's Drilling Catalog #7061 which was printed and copyrighted in 1996.

In either case, cutting inserts are being used to provide replaceable cutting faces as well as more unique drill and/or mill designs that are capable of more than merely simple holemaking.

One such example is the milling cutters that have been designed to perform multiple functions at one time such as plunge and face milling. One such milling cutter is shown in U.S. Pat. No. 5,542,795 issued to Kennametal Inc.

Other examples are the edge chamfering or deburring drills shown in U.S. Pat. Nos. 5,173,013 and 5,288,184. The '013 patent shows a hole cutting and chamfering tool having a hole cutting insert 4 followed by chamfering inserts 10 and 14, all of which are aligned in a longitudinal manner along the tool. The '013 tool is operative to cut a hole through a workpiece and then chamfer the edges surrounding the hole on opposite sides of the workpiece using the tool from one side without having to remove the tool from the hole.

The '184 patent shows a deburring tool for deburring bore edges of bores. This tool does not hole make and rather deburs a made hole using knives 9 and 12 on opposite entrance and exit edges of the hole. In addition, cutting tool 13 is a plane knife which provides a plane surface in the hole.

These numerous drilling and milling tools are satisfactory for the intended or described objectives. However, it is a desired of those in the holemaking industry to have one tool that makes or cuts the hole in the workpiece and chamfers the entrance and exit edges in a controlled, balanced circle-interpolating manner. It is further desired of those in the holemaking industry to have one tool that makes or cuts the hole in the workpiece, chamfers the entrance and exit edges in a controlled and balanced circle-interpolating manner, and forms a groove, slot or threads within the workpiece between the entrance and exit edges and/or in the entrance face around the hole.

SUMMARY AND OBJECTS OF THE INVENTION

Accordingly, it is an object of the present invention to provide an improved holemaking tool.

It is a further objective of the present invention to provide such an improved holemaking tool which both makes the hole and chamfers the entrance and/or exit edges without removing or changing tools.

It is a further objective of the present invention in certain embodiments to provide such an improved holemaking tool which makes the hole, chamfers the entrance and/or exit edges without removing or changing tools, and cuts a slot or groove in the made hole between the entrance and exit edges without removing or changing tools.

It is a further objective of the present invention in certain embodiments to provide such entrance and exit edge chamfering simultaneously.

It is a further objective of the present invention in certain embodiments to provide such entrance and exit edge chamfering, as well as grooving simultaneously.

It is further an objective of the present invention in certain embodiments to provide a holemaking tool which makes the hole, and cuts a slot or groove in the made hole between the entrance and exit edges without removing or changing tools.

It is a further objective of the present invention to provide such an improved holemaking tool that provides a controlled, balanced holemaking and circle interpolating function.

It is a further objective of the present invention in certain embodiments to provide such an improved holemaking tool which has a trailing chamfering insert that does not require circle interpolation to chamfer.

It is further an objective of the present invention in certain embodiments to provide such an improved holemaking tool which makes and threads the hole.

It is further an objective of the present invention in certain embodiments to provide such an improved holemaking tool which makes the hole, chamfers the entrance and/or exit edges, and threads the hole.

It is further an objective of the present invention in certain embodiments to provide such an improved holemaking tool which makes the hole and cuts an annular groove in the entrance face around the hole.

It is further an objective of the present invention in certain embodiments to provide such an improved holemaking tool which makes the hole, chamfers the entrance and/or exit edges, and cuts an annular groove in the entrance face around the hole.

It is further an objective of the present invention in certain embodiments to provide such an improved holemaking tool which makes the hole, chamfers the entrance and/or exit edges, cuts a slot or groove in the made hole between the entrance and exit edges, and cuts an annular groove in the entrance face around the hole.

It is further an objective of the present invention in certain embodiments to provide such an improved holemaking tool which makes the hole, chamfers the entrance and/or exit edges, threads the hole, and cuts an annular groove in the entrance face around the hole.

It is further an objective of the present invention to perform any of the above-listed objectives without removing or changing tools.

It is further an objective of the present invention to provide such an improved holemaking tool which has reduced or substantially eliminated chatter and excess noise.

It is further an objective of the present invention to provide such an improved holemaking tool that is faster, more accurate, and provides better finished surfaces than current technologies.

Still other objectives and advantages are achieved by the present invention, many of which may be apparent from a reading of the following summary of the invention and detailed description subsequent thereto.

The present invention is a holemaking tool.

DETAILED DESCRIPTION OF THE INVENTION

Figure 1:
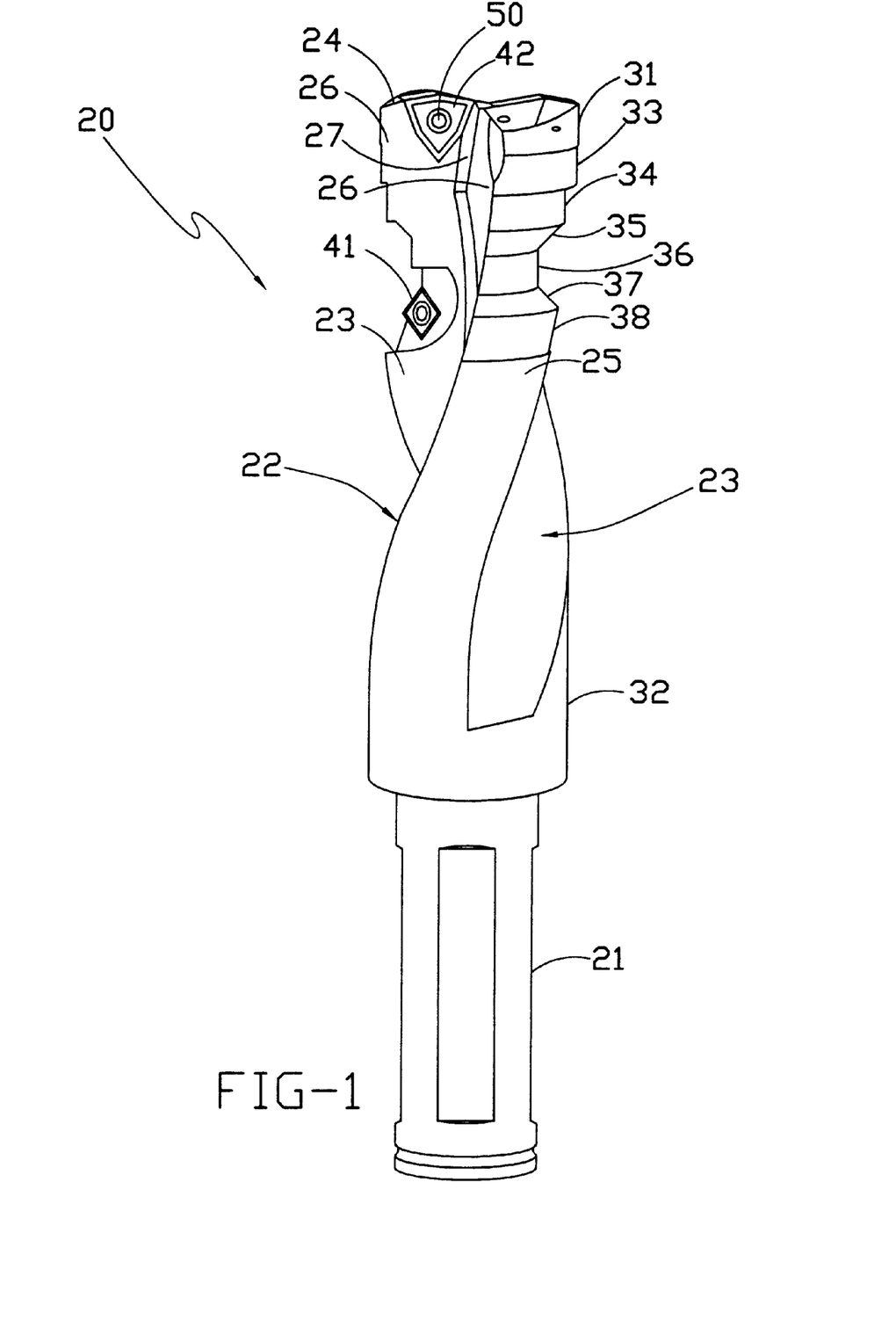
FIG. 1 is a front isometric view of a first embodiment of the present invention of a holemaking and edge chamfering tool taken from a first side.

Referring now to FIG. 1, a first embodiment of the present invention is shown as tool 20. Tool 20 is a rotary tool such as a drill or a mill that includes a shank 21 and a cutting head 22. The cutting head 22 includes two or more spiral or helical flutes 23 extending from an end 24 of the head spirally or helically inward along an outer surface 25 of the head to substantially the other end of the head. In the displayed embodiment, each flute includes two major surfaces 26 converging to an inner point or face 27.

The head 22, approximate its end 24, has a reduced diameter section 30. The reduced diameter section 30 divides the cutting head 22 and specifically its outer surface 25 into a lead portion 31, the reduced diameter section 30, and a trailing portion 32.

In one embodiment, the reduced diameter section 30 includes, in order from the lead portion 31 to the trailing portion 32, a first cylindrical section 33, a second cylindrical section 34, a first conical section 35, a third cylindrical section 36, a second conical section 37, and a fourth cylindrical section 38. As is shown in the FIGS. 1–8, the third cylindrical section 36 is the smallest diameter with the first and second conical sections 35 and 37 increasing in diameter therefrom to the second and fourth cylindrical sections 34 and 38, respectively.

In the displayed embodiment, the leading portion 31 and trailing portion 32 are of the same diameter, although this is not required. The reduced diameter portion 30 is of a lesser diameter so as to not inhibit holemaking in any manner. The conical sections 35 and 37 and the third cylindrical section 36 are of a sufficiently small diameter to avoid contact with the workpiece during circle interpolation.

Figure 2:
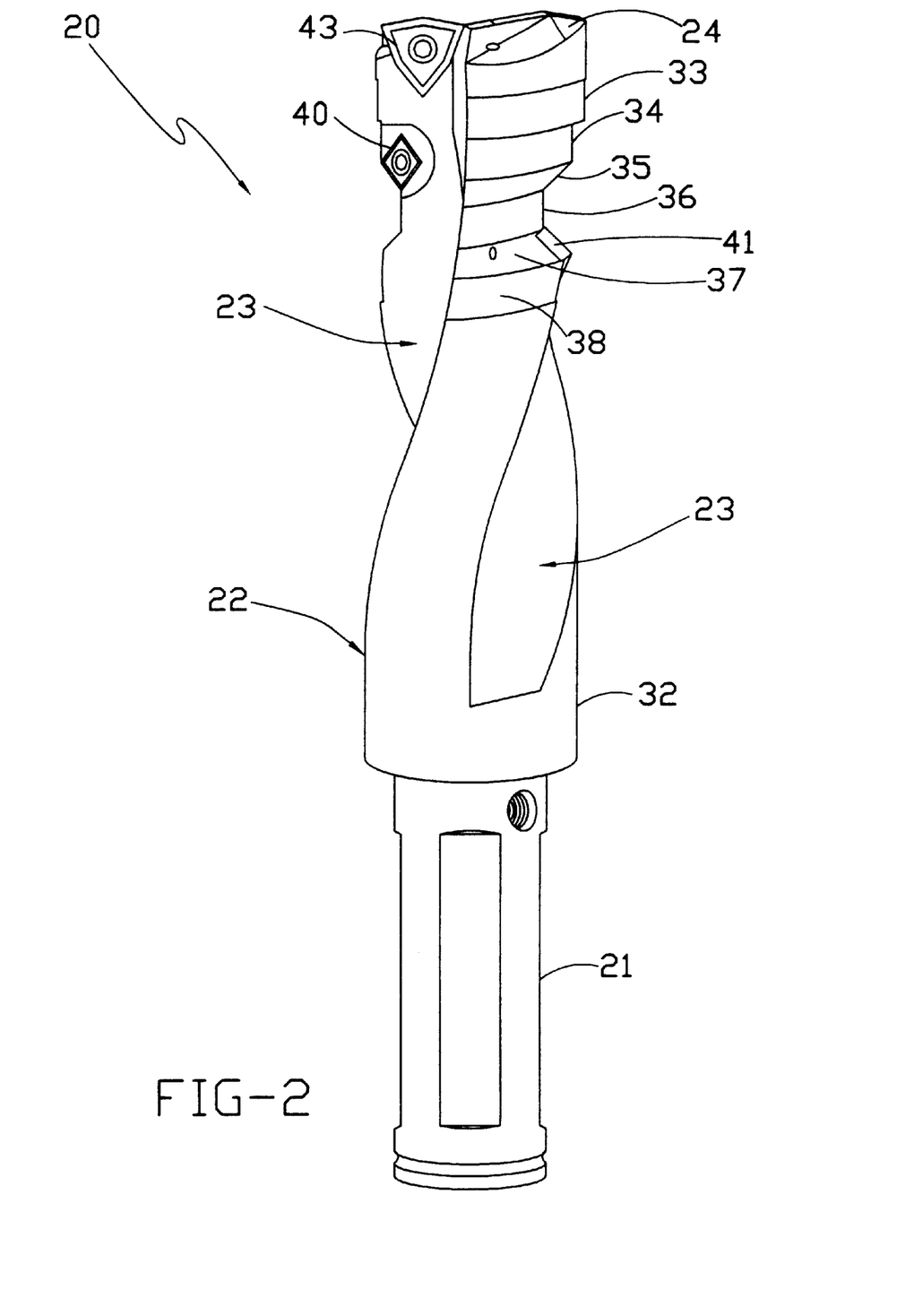
FIG. 2 is a back isometric view of the first embodiment of the present invention of the holemaking and edge chamfering tool of FIG. 1 taken from a second side approximately 180° from the first side.
Figure 3:
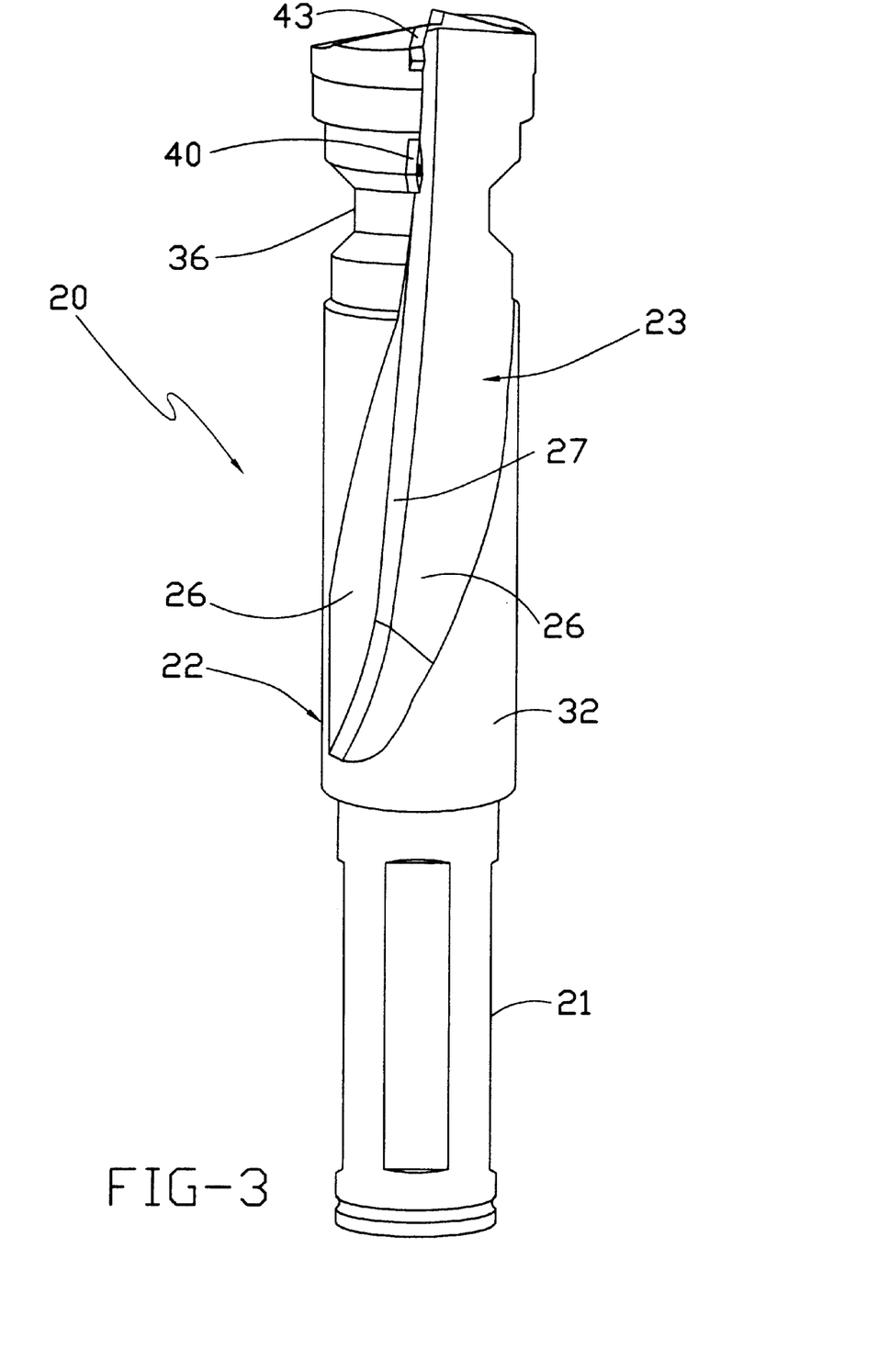
FIG. 3 is a right side isometric view of the first embodiment of the present invention of the holemaking and edge chamfering tool of FIG. 1 taken from a third side approximately 90° reverse twisted from the first side.
Figure 4:
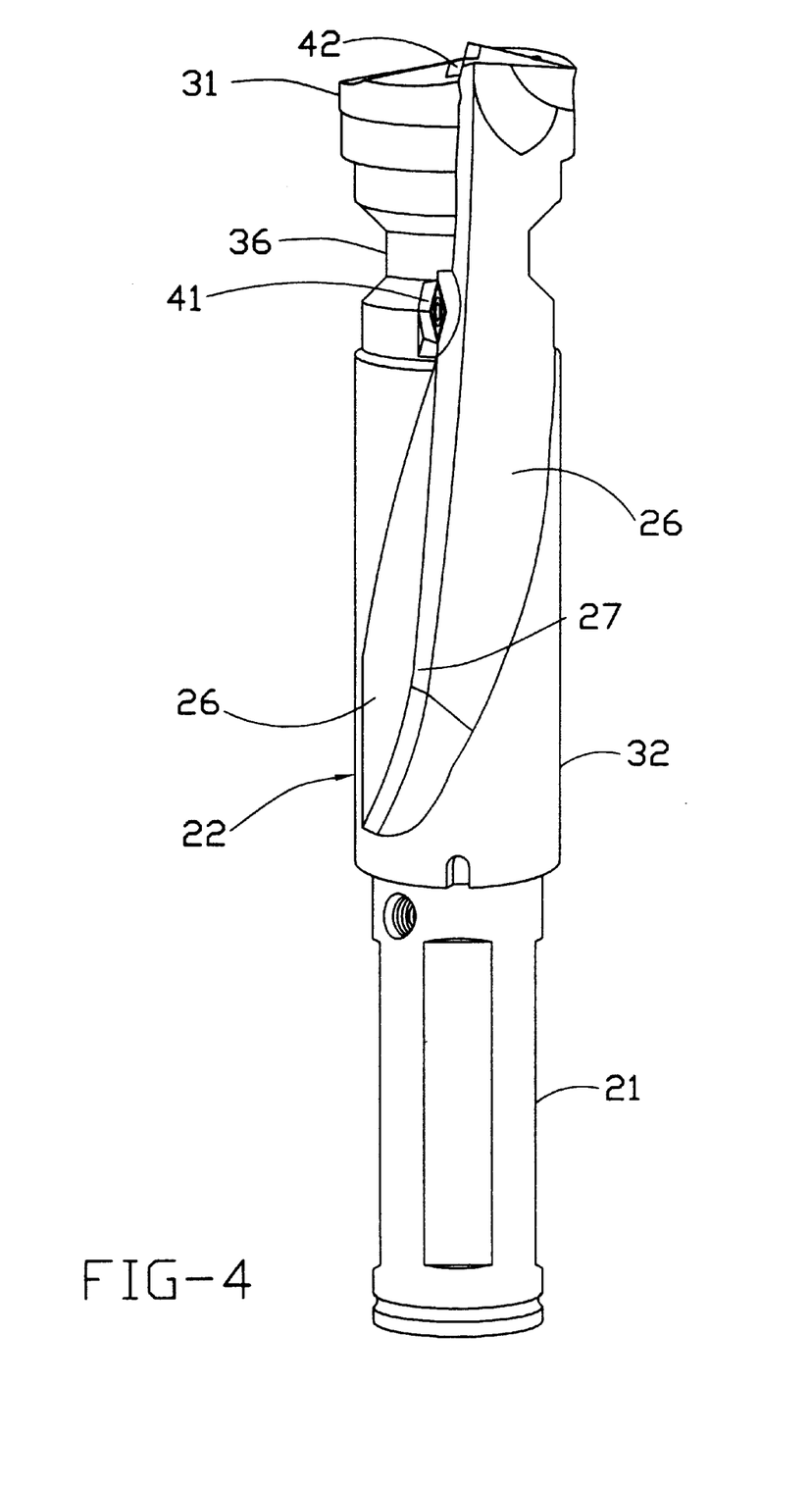
FIG. 4 is a left side isometric view of the first embodiment of the present invention of the holemaking and edge chamfering tool of FIG. 2 taken from a fourth side approximately 90° forward twisted from the first side.

Leading and trailing chamfering inserts 40 and 41, respectively, are affixed to the tool 20 along or approximate the second and fourth cylindrical sections 34 and 38, respectively and in a manner so as to expose a cutting edge 44 on each of the inserts along the outer edge of the flutes. In addition, inner and outer holemaking inserts 42 and 43, respectively, are each affixed to the tool on one of the surfaces 26 and within opposing flutes 23 so as to expose a cutting edge 45 along end 24. The inner holemaking insert 42 and the trailing chamfering insert 41 are best shown in FIGS. 1 and 4, while the outer holemaking insert 43 and the leading chamfering insert 40 are best shown in FIGS. 2–3.

The inserts 40–44 may be of either a railed or flat back surface. The inserts 40–44 are affixed using known techniques and products such as screw-on techniques that use fasteners 50 (screws, torx fasteners, etc.) that are inserted through a hole (not shown)in the center of the insert and threaded into a hole (not shown) in the cutting head 22. Other techniques include clamp-style, lock pin, or any other technique known in the industry to affix inserts to tools. One example of such is Kennametal's KENLOC® pin-clamps.

In the displayed embodiment, the leading and trailing chamfering inserts 40 and 41, and the inner and outer holemaking inserts 42 and 43 are Kennametal® inserts such as DRILL-FIX™ inserts, HTS-C™ inserts, HTSTM inserts, and/or KDDH™ inserts including those traded under the following trademarks and grade designations: XCGT-LD, XCGT-MDT, XCGT-GDT, XCGT-HDT, SPGT-MDT, SPGX, SPHX-20, SPHX-21, and SPHX-22, all of which are hereby incorporated by reference. It is contemplated and within the scope of this invention that these inserts need not be Kennametal inserts as described above, and instead may be of a different size, shape, style, design, configuration, or other type so long as the inserts perform the necessary holemaking and/or chamfering cutting as described above.

In the displayed embodiment, two holemaking and two chamfering inserts are shown, although one of each or three or more of each is contemplated. The holemaking inserts 42 and 43 are positioned substantially opposite one another on the tool so as to best balance the tool. In the displayed embodiment there are two holemaking inserts so these inserts are separated circumferentially by approximately 180°. Each of the inserts is substantially planar and is aligned such that it is approximately radial to the central axis except for rake face and other angular adjustments and considerations which improve cutting and are well known in the art and hereby incorporated by reference. One of the inserts, the inner insert 42, is positioned substantially adjacent the central axis of the tool while the other insert, the outer insert 43, is positioned radially outward and adjacent the outer surface of the tool while each of the inserts overlaps to assure all material is removed in the advancing rotary path of the tool. If, for instance, three holemaking inserts are desired, then three flutes would be manufactured in the head and the inserts would be circumferentially spaced apart by approximately 120°.

The chamfering inserts 40 and 41 are similarly positioned substantially opposing one another on the tool so as to best balance the tool. In the displayed embodiment there are two chamfering inserts so these inserts are separated circumferentially by approximately 180°. This spacing would change accordingly based upon the number of inserts desired should a number other than two be selected as any reasonable number is contemplated.

Figure 5:
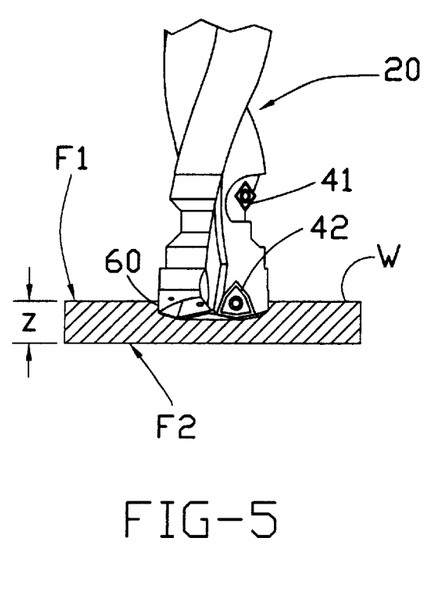
FIG. 5 is a partial sectional view of a workpiece with the holemaking and edge chamfering tool of the present invention of FIGS. 1–4 advancing in an axial and rotary manner to begin a hole.
Figure 6:
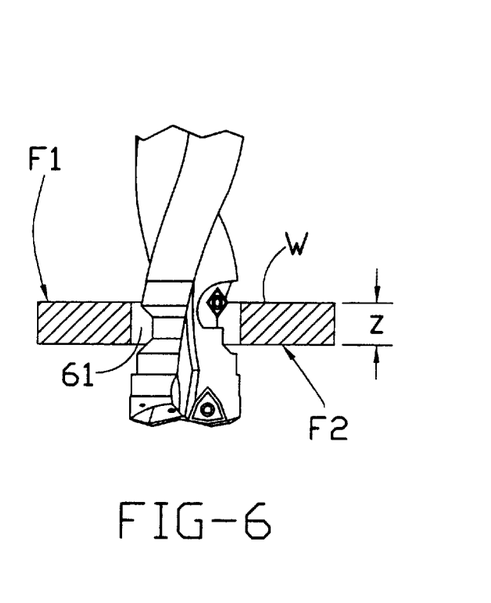
FIG. 6 is the same partial sectional view of the workpiece as in FIG. 5 except the holemaking and edge chamfering tool of FIGS. 1–4 has advanced in an axial and rotary manner completely through the workpiece.
Figure 7:
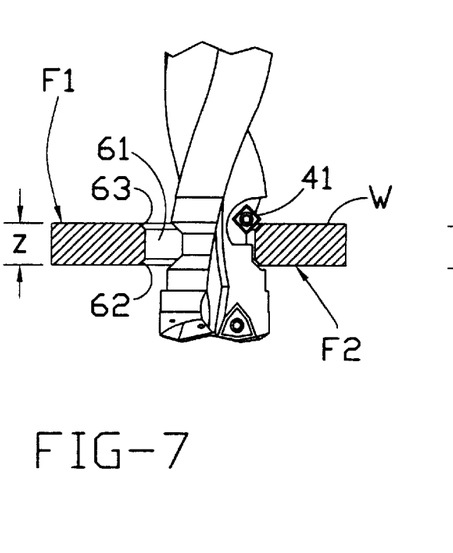
FIG. 7 is the same partial sectional view of the workpiece as in FIGS. 5–6 except the holemaking and edge chamfering tool of FIGS. 1–4 is circle interpolating to chamfer the entrance and exit edges with the cutting insert on the entrance edge being shown performing the chamfering.

In use, the tool of FIGS. 1–8 is rotary advanced such that its end 26 comes into contact with an entrance face F1 of a workpiece W at a desired point of holemaking. The inner and outer inserts 42 and 43 engage the workpiece W. The rotary advancing of the tool is continued whereby a cavity 60 is formed as is shown in FIG. 5, and continued advancement results in a hole 61 completely through the material as is shown in FIG. 6 as the tool exits the workpiece through a face F2.

The tool is then centered without removing the tool from the hole. The tool is then circle interpolated and rotated simultaneously such that the chamfering inserts 40 and 41 chamfer the exit and entrance edges 62 and 63, respectively, of the hole 61. If the distance between the chamfering inserts corresponds to the width Z of the workpiece then the chamfering of both the entrance and exit edges may be accomplished simultaneously.

Alternatively, if the workpiece W is thinner, that is the distance between the chamfering inserts is greater than the width Z of the workpiece W, then each edge 62 and 63 must be chamfered separately with an axial adjustment of the tool as to hole depth between entrance and exit edge finishing.

Figure 11:
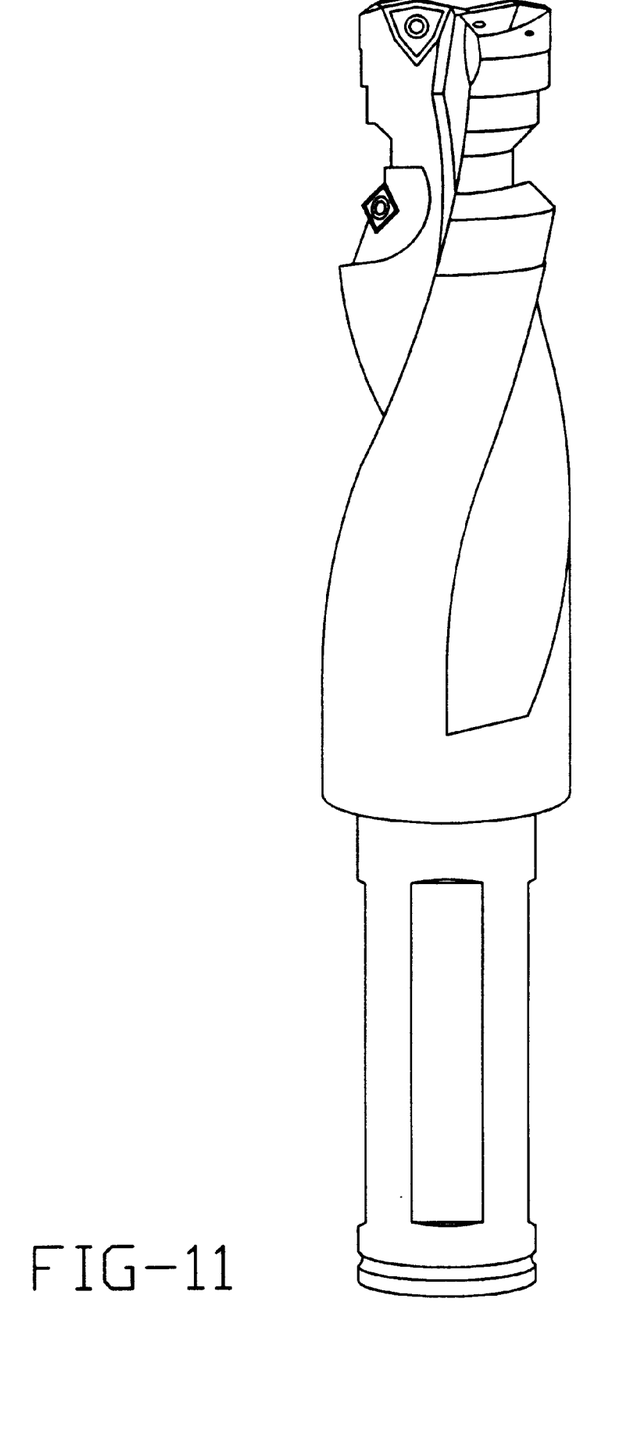
FIG. 11 is the same isometric view as shown in FIG. 1 except the trailing portion of the cutting head is oversized such that the trailing chamfering insert is positioned at approximately the same radius from the central axis of the tool so as to allow for chamfering without circle interpolating.

An even further alternative is accomplished using the tool 120 as shown in FIG. 11. In this case, the trailing chamfer insert 141 is positioned radially further from the center axis of the tool and at approximately the same diameter as the lead portion 131 of the cutting head 121. In this manner, immediately after or simultaneously with holemaking as described above and shown in FIG. 6, the tool 120 is further rotary advanced such that the trailing chamfering insert 141 engages the entrance edge 162 and chamfers it accordingly. Thereafter should chamfering of the exit edge be desired, the tool 120 is centered, hole depth adjusted and circle interpolated with the leading chamfering insert 140 engaging the exit edge 163.

This further radially outward positioning of the trailing chamfer insert 141 is accomplished by the tool 120 having a trailing portion 132 of a larger diameter than the leading portion 131. This allows the insert 141 to be positioned on the flute face 126 at a position radially outward from the center axis of the tool 120 at approximately the same radius as the outer surface 25 of leading edge 131.

A comparison of the embodiments of FIGS. 1–8 and 11, discloses that in the displayed embodiments in FIGS. 1–8, the lead and trailing chamfering inserts 40 and 41, respectively, are affixed to the tool 20 along or approximate the second and fourth cylindrical sections 34 and 38, respectively. The second and fourth cylindrical sections are of substantially the same or exactly the same diameter, and the inserts are affixed at substantially the same radius from the central axis. However, the inserts may be at different radii from the central axis of the tool so as to provide different chamfers.

In the embodiment of FIG. 11, the trailing chamfering insert 41 may be positioned significantly further radially from the central axis in the manner shown in the FIG. This is typically accomplished by making the fourth cylindrical section 38 of a larger diameter so that the insert 41 is the same or of a slightly larger radius from the central axis of the tool than the holemaking inserts. This allows for trailing chamfering, that is chamfering of the entrance edge, by mere further rotary advancement of the tool without the need for any circle interpolation. In many applications, only the entrance edge needs chamfered and this eliminates completely the circle interpolation step.

Figure 8:
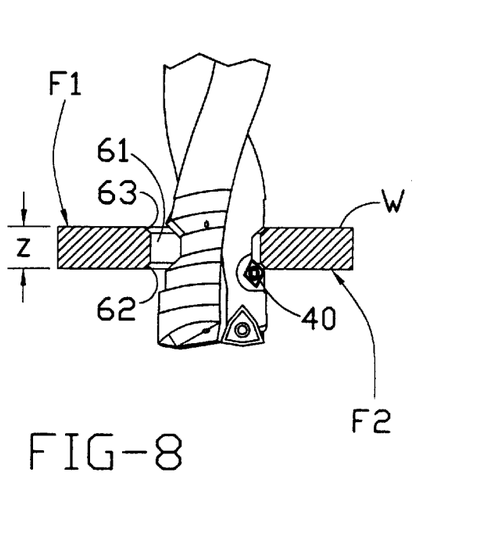
FIG. 8 is the same partial sectional view of the workpiece as in FIG. 7 with the same circle interpolating being performed except the cutting insert shown is on the exit edge.
Figure 9:
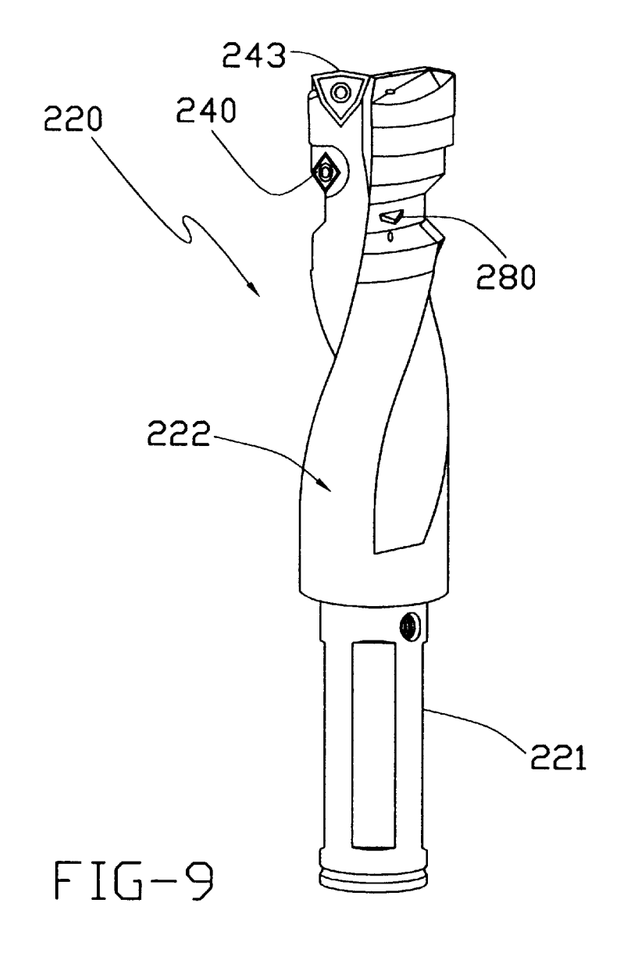
FIG. 9 is a front isometric view of a second embodiment of the present invention of a holemaking, edge chamfering and grooving tool taken from the same side as FIG. 2 of the first embodiment.

A second embodiment of this tool is shown in FIG. 9 as tool 220. This tool is identical or substantially identical to the tool 20 of FIGS. 1–8 except a grooving insert 280 is provided within the reduced diameter portion 230. This grooving insert 280 in the displayed embodiment extends from the third cylindrical portion 36 which is the smallest diameter portion of the tool.

Figure 10:
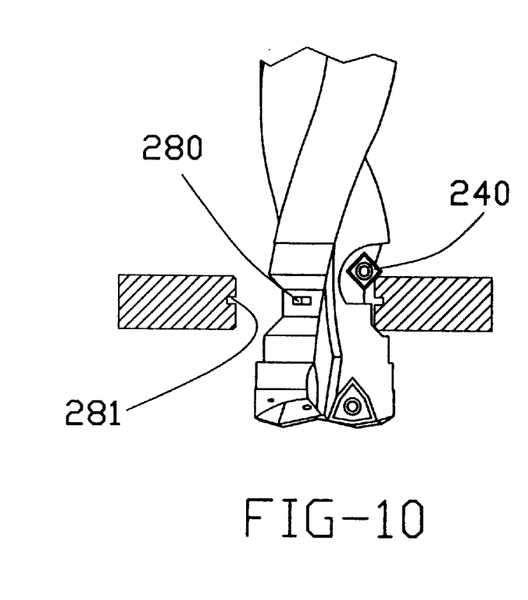
FIG. 10 is the same partial sectional view of the workpiece as shown in FIG. 8 except the tool is the second embodiment of the present invention of a holemaking, edge chamfering and grooving tool, as shown in FIG. 9, rather than the first embodiment and the tool is circle interpolating to both chamfer the entrance and exit edges and form a groove.

This grooving insert 280 provides for circumferential grooves as shown in FIG. 10 as groove 281 where tool 220 is circle interpolated and rotated but not advancing. Alternatively, threading can be accomplished by also advancing tool 220 during the circle interpolating and rotating where the axial advancement is controlled in conjunction with the interpolating and rotating, as is well known in the art. In either case, the geometric shape of the groove, slot or thread may be of any known cross section, such as square, triangular, etc.

In the displayed embodiment, the grooving insert is a Kendex® style, On-Line™ style, or Top Notch® style insert as manufactured and sold by Kennametal Inc. and hereby incorporated by reference. Examples of such inserts are shown on pages 159–254 in Kennametal's Lathe Tooling Catalog #6000 which was printed and copyrighted in 1996. This insert 280, however, may be of any design, style, shape, size, configuration or other type, so along as the insert performs the necessary grooving.

The grooving insert 280 is inserted, seated and affixed within a slot (not shown) in the tool 220 along reduced diameter portion 230. The insert 280 is held in place using any of the known techniques for securing a grooving or threading insert within a mill, drill or lathe tool.

Figure 13:
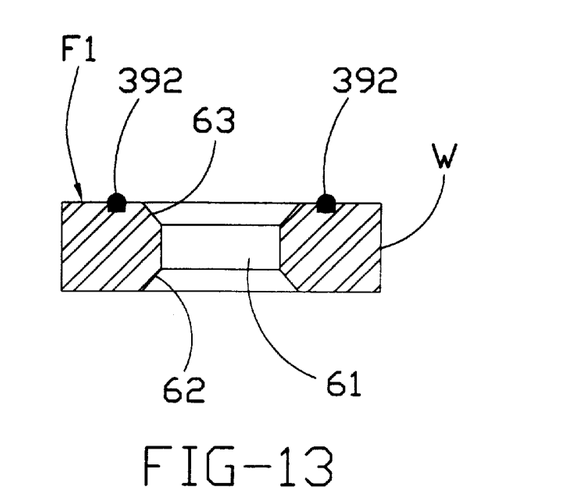
FIG. 13 is a sectional view of a workpiece in which a hole with chamfered edges has been cut just as is shown in FIGS. 5–8 where an O-ring slot or groove has also been cut in the entrance face by the tool shown in FIG. 14.
Figure 14:
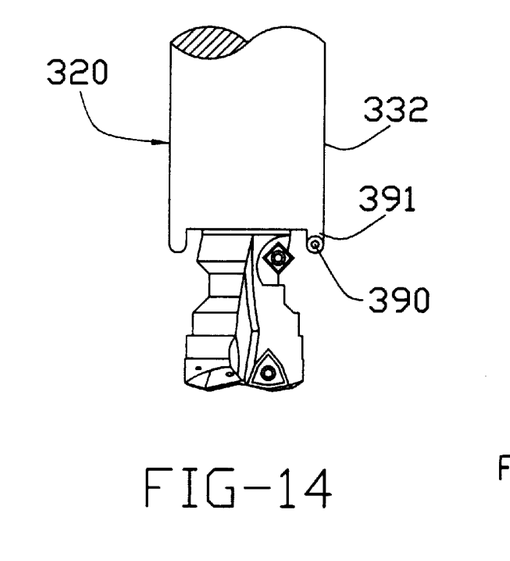
FIG. 14 is an isometric view of an alternative embodiment of the present invention where the holemaking and edge chamfering tool also has O-ring slot-making capabilities.

An even further embodiment of the tool is shown in FIG. 14 as tool 320. The tool is identical or substantially identical to the tool 20, except that the trailing portion is oversized as trailing portion 332 and includes an O-ring groove insert 390. The shank is oversized to a diameter greater than the trailing portion 332. The oversized trailing portion 332 includes one or more insert seats 391 on which inserts 390 are affixed so as to during rotary advancement cut a groove in entrance face F1 as shown with a seal 392 in it in FIG. 13.

Figure 15:
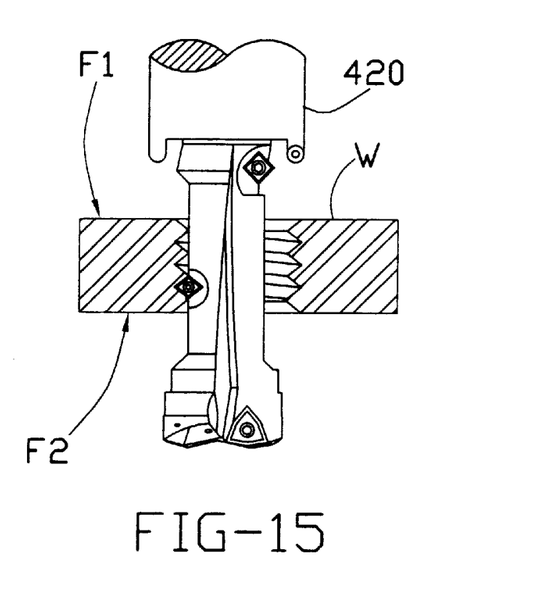
FIG. 15 is a partial sectional view of a workpiece having another alternative embodiment of tool holemaking therein where the tool holemaker, chamfers, threads, and O-ring grooves.

A yet even further embodiment of the tool is shown in FIG. 15 as tool 420. The tool is identical or substantially identical to tools 220 and 320, except that it combines the grooving capabilities of tool 220 with the O-ring grooving capabilities of tool 320. The tool is thus capable of holemaking, chamfering, slotting within the hole, or threading within the hole (as shown in FIG. 15), and O-ring grooving in the entrance face, or any combination thereof.

Figure 12:
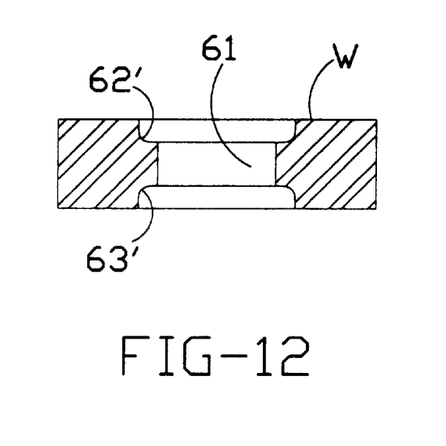
FIG. 12 is a sectional view of a workpiece that has been entrance and exit chamfered with different inserts to provide O-ring grooves with rounded edges.

The chamfering inserts could be any number of different type inserts capable of finishing the edges to any number of different finishes. One such edge is shown in FIGS. 8 and 13 where an approximately 45° surface 62 or 63 is created that is substantially planar, thereby defining a funnel between the faces F1 and F2 and the cylindrical bore 61. Another such edge is shown in FIG. 12, where surfaces 62' and 63' are created which are concave and thus form a bowl-like transition between faces F1 and F2 and the cylindrical bore 61. Many other surfaces are contemplated and/or known in the art and hereby incorporated by reference.

The inserts further may be of any material type including any substrate and any coating type. Similarly, this concept is applicable to tools made of any material.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A rotary tool for holemaking, comprising:
    a holemaking body with a central axis therein, the holemaking body including a cutting region and a shank region, the cutting region extending from the shank region to an end surface opposite thereof with an outer surface extending therebetween, the cutting region further including at least a first and second spiraling flute in the outer surface, the cutting body even further including an annular groove bisecting the outer surface and having a grooving insert affixed within the annular groove, and;
    at least one holemaking insert affixed adjacent to the end surface of the cutting region; and
    first and second chamfering inserts, the first chamfering insert affixed within the first flute along a portion of the annular groove nearer the end surface, and the second chamfering insert affixed within the second flute along another portion of the annular groove farther from the end surface than the portion of the annular groove the first chamfering insert is affixed to.

2. The rotary tool for holemaking of claim 1, wherein the annular groove includes first and second surfaces oblique to the outer surface and central axis.

3. The rotary tool for holemaking of claim 2 wherein the first chamfering insert is affixed within the first flute along the first surface within the annular groove, and the second chamfering insert is affixed within the second flute along the second surface within the annular groove.

4. The rotary tool for holemaking of claim 1 wherein two holemaking inserts are affixed adjacent to the end surface of the cutting region, a first holemaking insert being radially outward from the central axis along the end surface while a second holemaking insert is radially inward and adjacent the central axis along the end surface.

5. The rotary tool for holemaking of claim 1 wherein the chamfering inserts are seated within the annular groove such that circle interpolation is necessary for chamfering to occur after holemaking.

6. The rotary tool for holemaking of claim 1 wherein the outer surface forms an imaginary cylinder in which the chamfering inserts are positioned.

7. The rotary tool for holemaking of claim 1 wherein the chamfering and holemaking inserts are substantially radially oriented.

8. The rotary tool for holemaking of claim 1 wherein the annular groove bisecting the outer surface of the cutting region defines a reduced diameter portion separating substantially similar larger diameter leading and trailing portions.

9. The rotary tool for holemaking of claim 1 wherein the annular groove bisecting the outer surface of the cutting region defines a reduced diameter portion separating a leading larger diameter portion from a trailing portion of a diameter larger than both the leading and reduced diameter portions.

10. The rotary tool for holemaking of claim 1 wherein the grooving insert is affixed within a slot in the annular groove.

11. The rotary tool for holemaking of claim 10 wherein the annular groove includes a neck in between the first and second surfaces oblique to the outer surface and central axis wherein the slot holding the grooving inserts is positioned therein.

12. A rotary tool for holemaking, comprising:
    a holemaking body with a central axis therein, the holemaking body including a cutting region and a shank region, the cutting region extending from the shank region to an end surface opposite thereof with an outer surface extending therebetween, the cutting region further including at least a first and second spiraling flute in the outer surface, the cutting body even further including an annular groove bisecting the outer surface, and;
    at least one holemaking insert affixed adjacent to the end surface of the cutting region;
    first and second chamfering inserts, the first chamfering insert affixed within the first flute along a portion of the annular groove nearer the end surface, and the second chamfering insert affixed within the second flute along another portion of the annular groove farther from the end surface than the portion of the annular groove the first chamfering insert is affixed to, and;

a grooving insert affixed within the annular groove in between the first and second chamfering inserts.

13. The rotary tool for holemaking of claim 12 wherein the annular groove bisecting the outer surface of the cutting region defines a reduced diameter portion separating a leading portion of a diameter larger than the reduced diameter portion from a trailing portion of a diameter larger than both the leading and reduced diameter portions whereby one chamfering insert is positioned approximate each of the intersections of the leading and trailing edges with the reduced diameter portion.

14. A method of making a hole with chamfered edges, the method comprising:

advancing a holemaking tool into and through a workpiece thereby defining a hole therein, the holemaking tool including at least one holemaking insert affixed to an end of the tool and at least a pair of chamfering inserts affixed within opposing flutes in the tool; without removing the holemaking tool, chamfering at least one of the entrance and exit edges; and cutting at least one groove into the workpiece in between the entrance and exit edges using a grooving insert affixed to the tool in between the pair of chamfering inserts.

15. The method of making a hole of claim 14 whereby the chamfering is performed by circle interpolating the holemaking tool.

16. The method of making a hole of claim 15 further comprising the step of chamfering the entrance edge during the holemaking tool advancing step whereby the pair of chamfering inserts includes a leading and a trailing insert where the trailing insert is radially positioned outward on the tool in approximate alignment with an outermost point of the at least one holemaking insert.

17. The method of making a hole of claim 16 wherein the chamfering of at least one of the entrance and exit edges includes chamfering the exit edge by circle interpolating the holemaking tool using the leading insert.

18. The method of making a hole of claim 14 wherein the tool is rotary advanced and circle interpolated so as to thread the hole using the grooving insert.

19. The method of making a hole of claim 15 further comprising the step of cutting at least one groove into an entrance face on the workpiece.

20. The method of making a hole of claim 14 wherein the step of cutting the groove and the step of chamfering the entrance and exit edges occur simultaneously.

21. The method of making a hole of claim 15 further comprising the step of cutting at least one groove into the workpiece in between the entrance and exit edges using a grooving insert affixed to the tool in between the pair of chamfering inserts.

22. The method of making a hole of claim 14 wherein the chamfering of the entrance edge is performed merely by rotary advancement of the tool while the chamfering of the exit edge is performed by circle interpolation of the tool.

* * * * *